US 8,780,416 B2

(12) United States Patent
Inoue et al.

(10) Patent No.: US 8,780,416 B2
(45) Date of Patent: Jul. 15, 2014

(54) LIGHT IRRADIATOR, IMAGE SCANNER, AND IMAGE FORMING APPARATUS

(71) Applicants: Tokiko Inoue, Tokyo (JP); Mitsuru Nakajima, Kanagawa (JP); Tsuyoshi Fujimoto, Kanagawa (JP); Akihiro Iwamatsu, Kanagawa (JP); Chihiro Tanaka, Kanagawa (JP)

(72) Inventors: Tokiko Inoue, Tokyo (JP); Mitsuru Nakajima, Kanagawa (JP); Tsuyoshi Fujimoto, Kanagawa (JP); Akihiro Iwamatsu, Kanagawa (JP); Chihiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/678,936

(22) Filed: Nov. 16, 2012

(65) Prior Publication Data

US 2013/0135859 A1    May 30, 2013

(30) Foreign Application Priority Data

Nov. 30, 2011    (JP) .................................. 2011-262754

(51) Int. Cl.
*H04N 1/04*    (2006.01)

(52) U.S. Cl.
USPC .......................................... 358/474; 358/509

(58) Field of Classification Search
USPC ......................................... 358/475, 509, 474
See application file for complete search history.

(56) References Cited

U.S. PATENT DOCUMENTS

| 7,202,983 | B2 * | 4/2007 | Yokota et al. | 358/496 |
| 7,535,602 | B2 * | 5/2009 | Ohara | 358/474 |
| 7,538,911 | B2 * | 5/2009 | Sakurai et al. | 358/475 |
| 7,637,509 | B2 * | 12/2009 | Dußler et al. | 277/637 |
| 8,179,580 | B2 * | 5/2012 | Iwamatsu et al. | 359/196.1 |
| 8,300,279 | B2 * | 10/2012 | Mukai et al. | 358/474 |
| 8,477,385 | B2 * | 7/2013 | Takahashi et al. | 358/474 |
| 8,526,065 | B2 * | 9/2013 | Takabatake | 358/408 |
| 2006/0008295 | A1 | 1/2006 | Kohchi et al. | |

FOREIGN PATENT DOCUMENTS

| JP | 4-018771 | 1/1992 |
| JP | 8-315621 | 11/1996 |
| JP | 9-138402 | 5/1997 |
| JP | 10-322521 | 12/1998 |
| JP | 2006-025303 | 1/2006 |
| JP | 2007-221359 | 8/2007 |

* cited by examiner

*Primary Examiner* — Negussie Worku
(74) *Attorney, Agent, or Firm* — Oblon, Spivak, McClelland, Maier & Neustadt, L.L.P.

(57) ABSTRACT

A light irradiator including multiple point light sources arranged in a straight line, a light-transmissive light guiding member provided in front of the point light sources in an emission direction of beams of light emitted from the point light sources, the light guiding member guiding the beams of light in a predetermined direction toward a surface to be irradiated; and two or more protrusions protruding toward the point light sources, provided on a light entering surface of the light guiding member and arranged in the same direction as the point light sources. The light guiding member and the point light sources are positioned such that a distance between the protrusions provided to the light guiding member and irradiation surfaces of the point light sources is equal at two positions.

8 Claims, 6 Drawing Sheets

LIGHT IRRADIATOR, IMAGE SCANNER, AND IMAGE FORMING APPARATUS

CROSS-REFERENCE TO RELATED APPLICATIONS

This patent application is based on and claims priority pursuant to 35 U.S.C. §119 to Japanese Patent Application No. 2011-262754, filed on Nov. 30, 2011, in the Japan Patent Office, the entire disclosure of which is hereby incorporated by reference herein.

BACKGROUND OF THE INVENTION

1. Field of the Invention

The present invention relates to a light irradiator and an image scanner using the light irradiator, and to an image forming apparatus using the image scanner.

2. Description of the Related Art

Some image scanners for use in image forming apparatuses such as photocopiers use light irradiators in which multiple light-emitting diodes (LED) (point light sources) are arranged in a straight line as light sources to irradiate documents with beams of light. Since illuminance ripple (variation of illuminance distribution) along the arrangement direction of the LEDs at the irradiation target (document) occurs, a light guiding member made of a transparent resin, glass, etc., is provided between the irradiation target and the point light sources.

This light guiding member guides the irradiation beams of light, which are emitted from the multiple point light sources and diffuse circularly, toward the surface of the document along the main scanning direction with regard to scanning the document to reduce the occurrence of illuminance ripple. This makes it possible to irradiate a wide target (document) with beams of light having a strong intensity even by using small LEDs as the light source.

JP-3187280-B1 (JP-H08-315621-A) and JP-3659770-B1 (JP-H10-322521-A) describe such structures. However, the structures described in JP-3187280-B1 (JP-H08-315621-A) and JP-3659770-B1 (JP-H10-322521-A) mentioned above have a problem in that irradiating a document along the main scanning direction evenly is difficult when the relative positions of the multiple LEDs and the light guiding member vary.

In a case in which a small light source having a relatively small light intensity such as LEDs is used, it is desired that the beams of light emitted from the light source enter the light guiding member as much as possible and from which the beams of light travel toward the target as much as possible while reducing the variation of the illuminance intensity. This demands a highly precise relative positioning of the light source and the light guiding member.

In an attempt to handle this demand, JP-4625279-B1 (JP-2006-025303-A) describes providing a positioning member for the LEDs (substrate) to maintain the relative positions of the light source and the light guiding member. However, although the precision of the relative positioning of the light source and the light guiding member is improved by providing the positioning member, the number of components necessarily increases, which is disadvantageous to manufacture a small and thin light irradiator.

In addition, if the positioning member is provided between the LED and the light guiding member, parts errors accumulate. This creates a concern about manufacturing in terms of more accurate assembly of the light source and the light guiding member. Furthermore, it is difficult to secure the relative positioning of the light source and the light guiding member if thermal conditions of the LED change.

SUMMARY OF THE INVENTION

In view of the foregoing, the present invention provides a light irradiator including multiple point light sources arranged in a straight line, a light-transmissive light guiding member provided in front of the point light sources in an emission direction of beams of light emitted from the point light sources, the light guiding member guiding the beams of light in a predetermined direction toward a surface to be irradiated; and two or more protrusions protruding toward the point light sources, provided on a light entering surface of the light guiding member and arranged in the same direction as the point light sources. The light guiding member and the point light sources are positioned such that a distance between the protrusions provided to the light guiding member and irradiation surfaces of the point light sources is equal at two positions.

As another aspect of the present invention, an image scanner is provided which includes the light irradiator mentioned above.

As another aspect of the present invention, an image forming apparatus is provided which includes the light image scanner mentioned above.

BRIEF DESCRIPTION OF THE SEVERAL VIEWS OF THE DRAWINGS

Various other objects, features, and attendant advantages of the present invention will be more fully appreciated as the same become better understood from the detailed description when considered in connection with the accompanying drawings in which like reference characters designate like corresponding parts throughout and wherein.

DETAILED DESCRIPTION OF THE INVENTION

Embodiments of the present disclosure are described with reference to the accompanying drawings, in which elements such as structural parts having the same feature or form are assigned the same reference numbers to omit redundant descriptions.

Image Forming Apparatus

Figure 1:
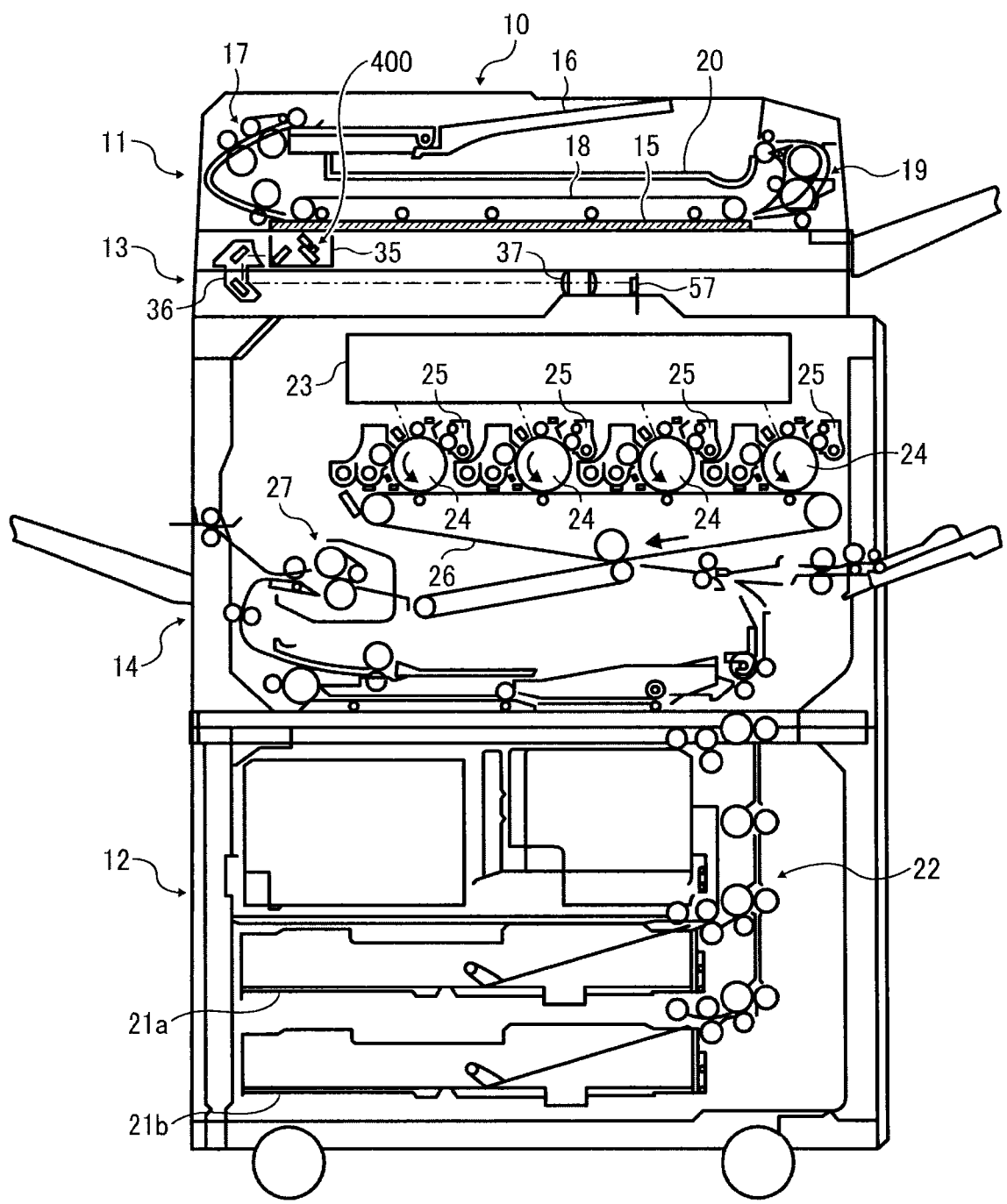
FIG. 1 is a schematic diagram illustrating an embodiment of the image forming apparatus to which the present disclosure is applied.

FIG. 1 is a diagram illustrating the structure of a color photocopier, which is one embodiment of the image forming apparatus employing electrophotography. In FIG. 1, a photocopier 10 has an automatic document feeder 11, a sheet feeder unit 12, an image scanner 13, and an image forming unit 14.

The automatic document feeder 11 transfers a document placed on a document tray 16 to a contact glass 15 serving as a document placement unit made of a transparent members by a sheet feeding separating device 17 formed of rollers such as a feeding roller and separating roller, conveys the document that has been already scanned by the image scanner 13 from the contact glass 15 by a conveyor belt 18, and discharges the document to a discharging tray 20 by a discharging device 19 formed of discharging rollers. When this automatic document feeder 11 scans an un-read surface of the document in duplex mode, it returns the document to the contact glass 15 by a separating mechanism provided to the discharging device 19 and the conveyor belt 18 scan the un-read surface.

The sheet feeder unit 12 has sheet feeder cassettes 21a and 21b to accommodate recording media (typically paper) having different sizes and a sheet feeding device 22 formed of rollers to convey the recording media accommodated in the sheet feeder cassettes 21a and 21b to the transfer position.

The image scanner 13, a detailed description of which is deferred, drives a first carriage 35 having a light irradiator 400 and a second carriage 36 in right and left direction (sub-scanning direction) in FIG. 1, irradiates the document placed on the contact glass 15 with beams of light from the light irradiator 400 to scan the document, reflects the scanning light at a mirror, and captures it in a pickup device 57 such as a charge-coupled device (CCD) by a lens unit 37.

The image forming unit 14 has an irradiator 23 to form writing signals based on the scanning signal taken in by the pickup device 57, multiple image bearing drums 24 on which the writing signals generated by the irradiator 23 are formed, respective developing devices 25 which are filled with respective different color toners of cyan, magenta, yellow, and black to supply the different color toners to respective image bearing drums 24 to visualize the writing signals, a transfer belt 26 serving as an intermediate transfer body on which the visual images formed on the respective image bearing drums 24 are superimposed to form a color image and which transfers this color image to a recording medium fed from the sheet feeder unit 12, and a fixing device 27 that fixes the color image transferred to the recording medium thereon.

Image Scanner

Figure 2:
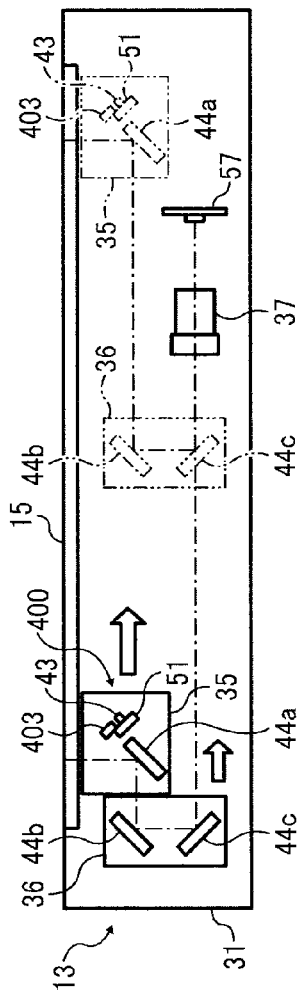
FIG. 2 is a side view illustrating an example of a structure of an image scanner related to the present disclosure.
Figure 3A:
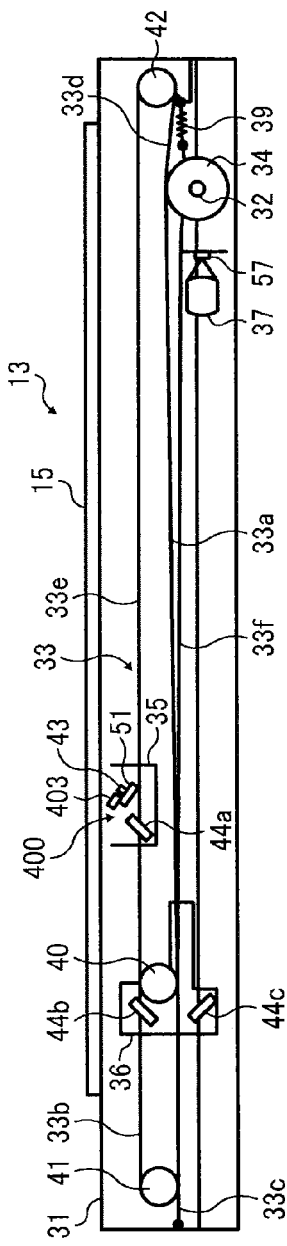
FIG. 3A is a schematic front view illustrating an image scanner and FIG. 3B is a schematic perspective view illustrating the image scanner.
Figure 3B:
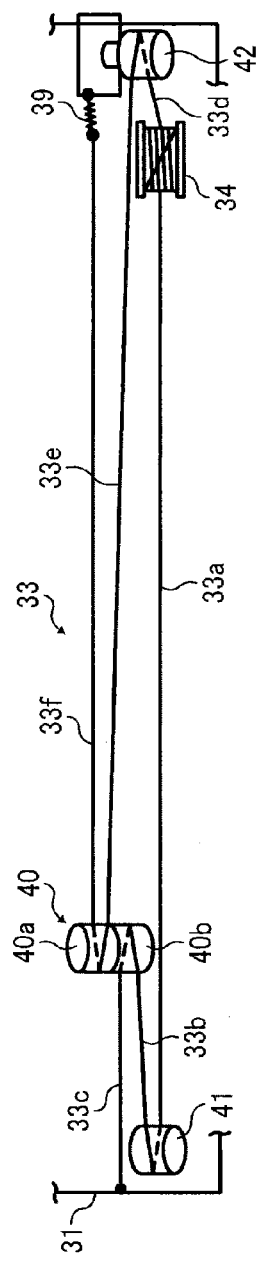

FIGS. 2, 3A, and 3B are diagrams illustrating the structure of the image scanner 13. FIG. 2 is a side view illustrating the positional relationship of each part of the image scanner 13. FIGS. 3A and 3B are schematic diagrams illustrating the relationship between a driving wire 33 for driving the second carriage 36 and each pulley. FIG. 3A is a side view thereof and FIG. 3B is a planar view illustrating the driving wire 33 in the linked state.

In FIGS. 2, 3A, and 3B, the image scanner 13 has a main frame 31, a driving shaft 32, a driving wire 33, a wire driving pulley 34, the first carriage 35, the second carriage 36, the lens unit 37, a tension spring 39, a carriage pulley 40, idler pulleys 41 and 42, and the pickup device 57.

Inside the main frame 31, there are provided a first rail and a second rail. The first carriage 35 serving as a travelling body is slidably attached to the first rail and the second carriage 36 is slidably attached to the second rail.

Connected to a motor, the wire driving pulleys 34 are provided to both ends of the driving shaft 32. The driving wire 33 extending in the right and left direction (predetermined direction) in FIGS. 3A and 3B is wound round this wire driving pulley 34. There are two driving wires 33, one to drive the first carriage 35 and the other to drive the second carriage 36. In FIGS. 3A and 3B, only the driving wire 33 to drive the second carriage 36 is shown.

The driving wires 33 and the idler pulleys 41 and 42 are provided both in front and at the rear of the main frame 31. Since both have the same structures and features, the driving wires 33 and the idler pulleys 41 and 42 at one end only are described. That is, in this embodiment, there are provided two wires 33 and four idler pulleys 41 and 42 on the four corners of the main frame 31. In addition, the carriage pulley 40 is provided to the second carriage 36 and the driving wire 33 are wound round each pulley via the carriage pulley 40 and the idler pulleys 41 and 42.

Light Irradiator

Figure 4:
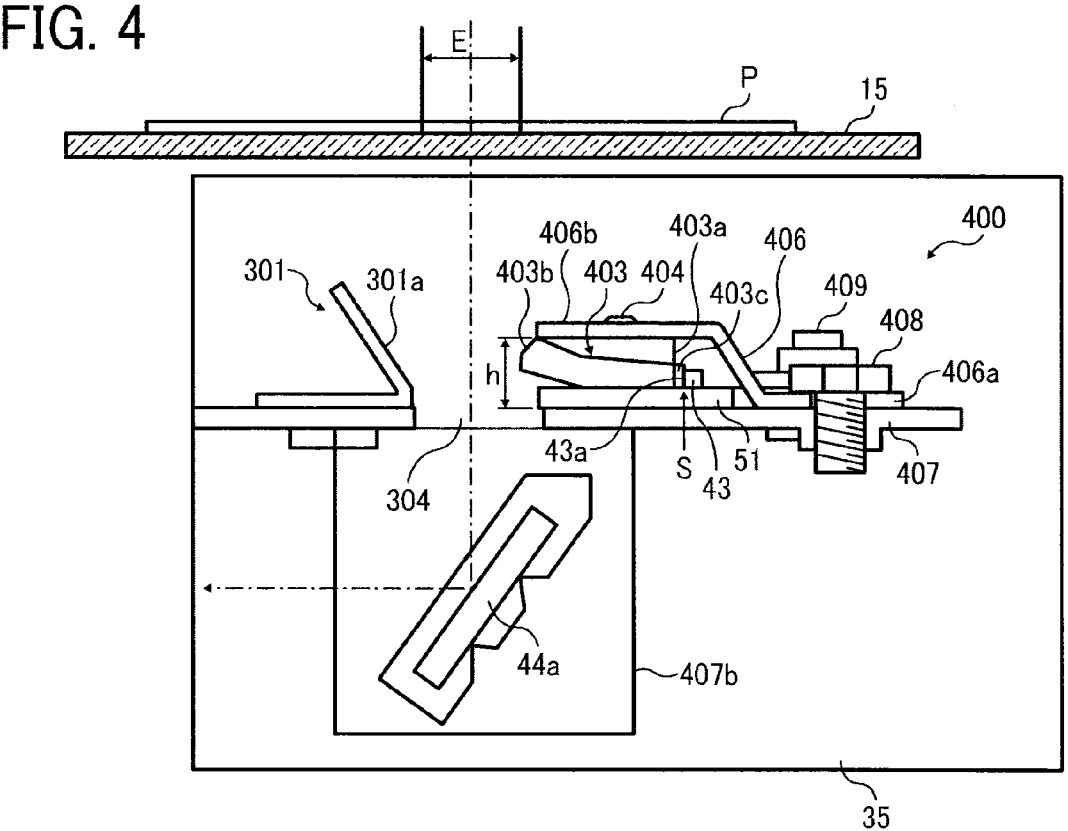
FIG. 4 is a cross section illustrating an example of a structure of a light irradiator related to the present disclosure.
Figure 5:
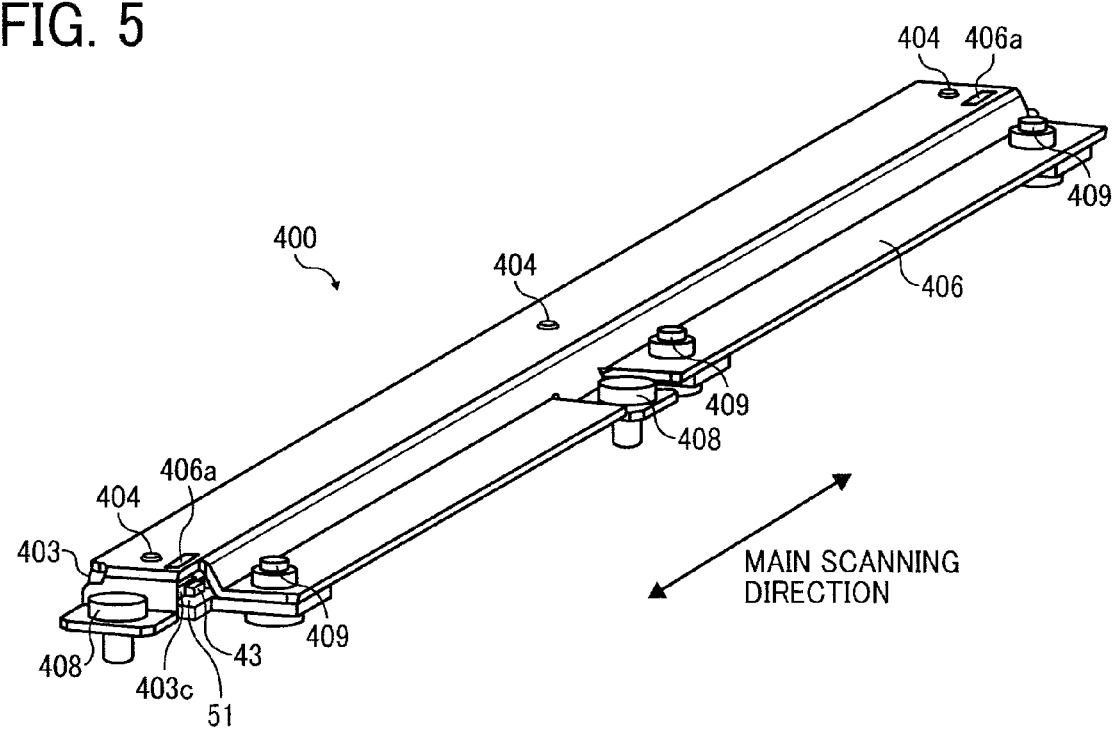
FIG. 5 is a perspective view illustrating an example of a light irradiator of the present disclosure.

As described in FIGS. 4 and 5, the first carriage 35 has a base 407 made of plate having a plane form and a pair of side plates 0 drooping from the base 407. A first mirror 44a serving as a reflecting member is attached between the pair of the side plates 407b. In FIG. 4, only one of the pair of the side plates separated from each other in the sheet direction (main scanning direction) is shown.

A cover member 406 having fixing and covering features is attached to the base 407 by a screw 408. The cover member 406 is formed of plate and has a base mounting portion 406a having a mounting surface to the base 407 and a holding portion formed significantly parallel to the base 407 with a predetermined distance h with the base 407. A step is made between the base mounting portion 406a and the holding portion along the sub-scanning direction and the distance h is determined to be slightly thinner than the accumulated thickness of the light guiding member 403 and a circuit boards {LED (=light emitting diode) substrate} 51 having a plate form.

The light guiding member 403 is positioned and fixed on the holding portion 406b of the cover member 406. The light guiding member 403 is made of resins such as acrylic having high transparency, etc. and has a structure in which a flat and significant cuboid form in the main scanning direction is folded in the sub-scanning direction.

In this embodiment, three positioning pins 404 (convex portions) integrally formed (molded) with the light guiding member 403 are formed toward the holding portion 406b of the cover member 406 and inserted into three pin holes (404a and 404b in FIG. 6) piercing the cover member 406 from the front to the back direction. The three positioning pins 404 are formed on three places (center and both ends in the longitudinal direction) on multiple upper surface convex portions 405 formed on the light guiding member 403 as illustrated in FIG. 7. In this Embodiment, the light guiding member 403 has five upper surface convex portions 405 in the main scanning direction with the light guiding member 403 and the cover member 406 contacting at each upper surface 405a of each upper surface convex portion 405.

As illustrated in FIGS. 4 and 5, the LED substrate 51 is mounted on the cover member 406 with multiple screws 409. The screws 409 are arranged imbalanced toward the side of the base mounting portion 406a of the cover member 406 (on the right side of FIG. 4) and fix the center and both ends in the main scanning direction of the LED substrate 51. The back of the LED substrate 51 is in contact with the base 407 excluding portions (e.g., Via) which are prohibited from contacting in terms of electricity.

Multiple LEDs 43 of a side view type serving as point light sources and light-emitting devices are attached to the LED substrate 51 along the main scanning direction. The LED 43 emits light from the irradiation surface (left end in FIG. 4) 43a of the LED 43 toward an incident surface (right end surface in FIG. 4) 403a of the light guiding member 403 by driving the LED substrate 51.

When sandwiching the light guiding member 403 and the LED substrate 51 with the base 407 and the cover member 406 to fix them in such a manner, there is a concern that the LED substrate 51 and the light guiding member 403 may be deformed by the heat generated from the LED substrate 51.

When the deformation by heat happens, the irradiation surface 43a of the LED 43 deflects from the incident surface 403a of the light guiding member 403, which leads to variation of the amount of light in the main scanning direction.

To handle this concern, from the side of the incident surface 403a of the light guiding member 403, the upper surface convex portion 405 of the light guiding member 403 has a thickness t increasing to the maximum around the LED 43 to press the portions around the LED arrays of the LED substrate 51 as illustrated in FIG. 7. In addition, the cover member 406 to sandwich the light guiding member 403 and the LED substrate 51 has a height h thinner than the accumulated thickness of the light guiding member 403 and the LED substrate 51. Consequently, this prevents misalignment between the irradiation surface 43a of the LED 43 and the incident surface 403a of the light guiding member 403, so that the light emitted from the LED 43 enters the incident surface 403a of the light guiding member 403 along the main scanning direction.

In addition, since the cover member 406 and the base 407 are made of plates, the heat produced from the LED substrate 51 is discharged into the air by conduction of heat. By having such a structure, deformation of the LED substrate 51 is prevented.

Figure 8:
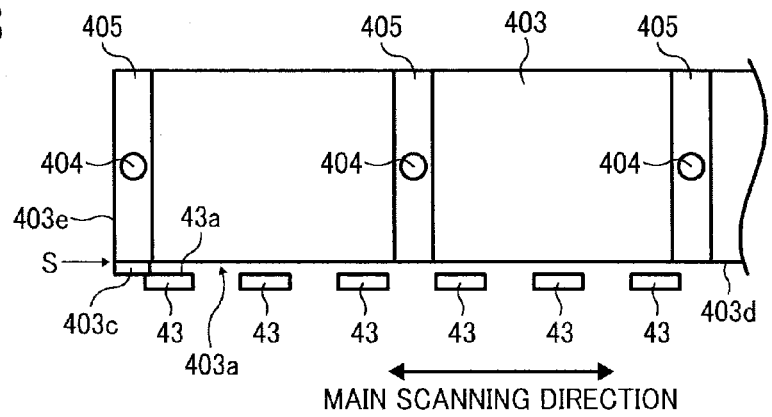
FIG. 8 is an enlarged view illustrating an arrangement of the light guiding member and the LED.

As illustrated in FIG. 4, since a reflector 301 is arranged on the side opposing an irradiation surface (left end surface in FIG. 4) 403b of the light guiding member 403, the light emitted from the LED 43 travels toward the contact glass 15 to evenly irradiate it using the total reflection in the light guiding member 403. In this case, the positioning pins 404 are arranged between the LEDs 43 in order not to face the LED 43 as illustrated in FIG. 8. This is to prevent the light that enters the light guiding member 403 from being absorbed by the positioning pins 404.

Figure 9:
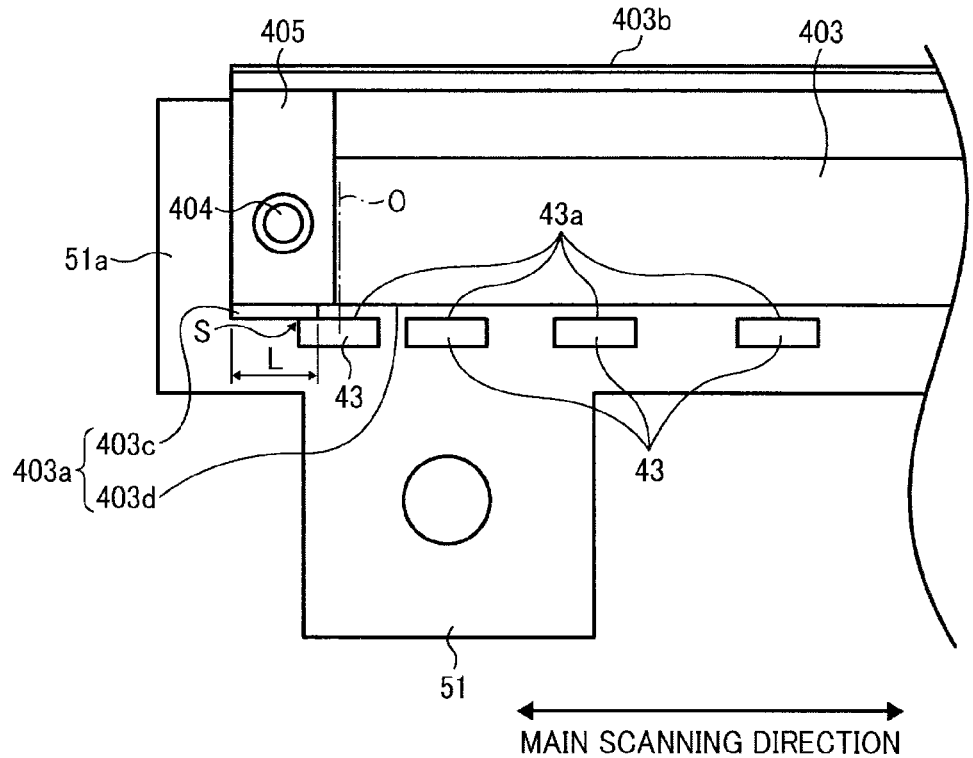
FIG. 9 is an enlarged view illustrating another arrangement of the light guiding member and the LED.

The irradiation surface 43a of the LED 43 faces the incident surface 403a of the light guiding member 403 as illustrated in FIGS. 4 and 9. In addition, the irradiation surface 43a of the LED 43 has an area smaller than that of the incident surface 403a of the light guiding member 403 (vertical width in FIG. 4).

As illustrated in FIG. 7, on an end surface 403d of the incident surface 403a of the light guiding member 403, incident surface convex portions 403c serving as protrusions are formed at both ends 403e and 403f relative to the main scanning direction that protrude towards the side of LED 43. That is, the incident surface 403a is formed of the end surface 403d and the incident surface convex portion 403c.

By arranging the incident surface convex portions 403c and the irradiation surfaces 43a of the LED 43 to have an equal distance (left and right direction in FIG. 4) at both ends, the light guiding member 403 and the LED 43 have a desired gap.

In addition, by positioning the LED 43 and the light guiding member 403 at both ends 403e and 403f of the light guiding member 403, it is possible to conduct the positioning at the widest positions relative to the main scanning direction to adjust the distance between the LED 43 and the light guiding member 403 precisely all the area along the main scanning direction.

Each incident surface convex portion 403c of the light guiding member 403 and the irradiation surface 43a of the LED 43 are brought into contact with each other with a distance S of zero.

Therefore, it is possible to adjust the distance between the light guiding member 403 and the LED 43 by simple assembly work of contacting both, which makes easy assembly possible. In addition, since the amount of LED light entering the light guiding member 403 at the position of the incident surface convex portion 403c increases, which makes is possible to increase the luminance at the ends of irradiation where the luminance tends to be low, an efficient light irradiator 400 having a less variation in the intensity of the luminance can be obtained.

That is, it is possible to conduct precise positioning of the irradiation surface 43a of the LED 43 and the incident surface 403a of the light guiding member 403 at a desired position while saving a space by positioning the distance between the light guiding member 403 and the LED 43, thereby obtaining an efficient light irradiator with a less variation in the intensity of the luminance.

Furthermore, since the incident surface convex portion 403c of the light guiding member 403 is provided at both ends 403e and 403f of the light guiding member 403 parallel with the main scanning direction, which is the arrangement direction of the LED 43, the precise positioning of the irradiation surface 43a of the LED 43 and the incident surface 403a of the light guiding member 403 under the greatest tolerance of the parts in a space-saving manner, thereby making it possible to provide an efficient light irradiator 400 having a less variation in the intensity of the luminance.

FIG. 9 is an enlarged diagram illustrating the portion including and near the incident surface convex portion 403c of the light guiding member 403 and the LED 43 and their surroundings. The incident surface convex portion 403c of the light guiding member 403 has a width L to contact only one LED 43 installed on a farthest end 51a of the LED substrate 51.

This width L is relative to the main scanning direction. The incident surface convex portion 403c of the light guiding member 403 is arranged while avoiding a center portion O of the LED 43. That is, the end of the incident surface convex portion 403c and the center portion O of the LED 43 are arranged apart relative to the main scanning direction.

Consequently, by facing the LEDs 43 to the incident surface convex portion 403c one to one, it is possible to reduce the number of the LEDs 43 that contact the incident surface convex portion 403c to minimum and reduce the impact of the incident surface convex portion 403c on the luminance distribution at the irradiated place to minimum. Therefore, an efficient light irradiator 400 having a less variation in the intensity of the luminance is provided.

In addition, it is possible to provide the incident surface convex portion 403c of the light guiding member 403 somewhere excluding the center portion O at which the LED 43 emits the beams of light having the strongest intensity. Consequently, it is possible to prevent an undesired impact of the incident surface convex portion 403c of the light guiding member 403 on the luminance distribution at the document surface. Therefore, it is possible to reduce the impact of the incident surface convex portion 403c on the luminance distribution at the irradiated position to minimum, thereby providing an efficient light irradiator having a less variation in the intensity of the luminance.

Figure 10:
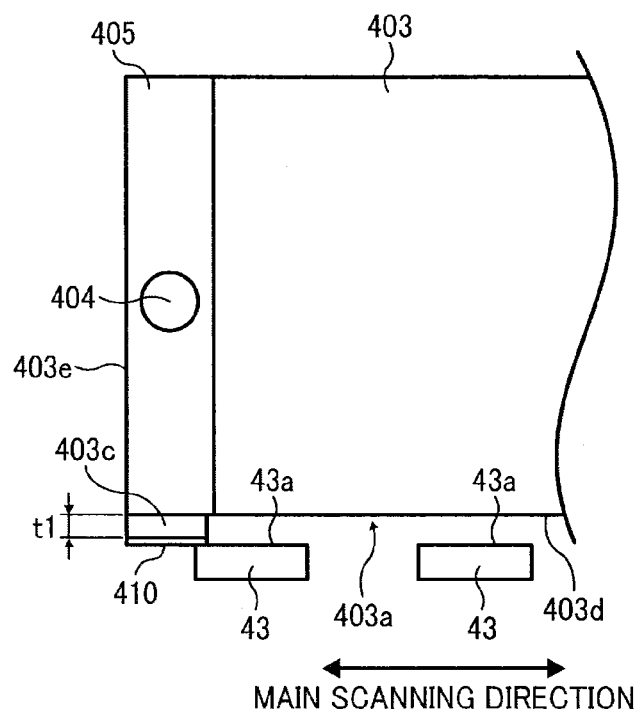
FIG. 10 is an enlarged view illustrating an example of a structure of the light guiding member in which an anti-reflection coating layer is applied to an entering surface convex portion.

As illustrated in FIG. 10, for example, if an anti-reflection coating layer 410 serving as an anti-refection device is provided at the incident surface convex portion 403c of the light guiding member 403, the impact of the incident surface convex portion 403c can be furthermore reduced, thereby providing more flexibility of the arrangement of the LED 43 and the light guiding member 403, which gives the arrangement precision of both some allowance, resulting in improvement of the assembly workability. In addition, by providing the anti-reflection coating layer 410, the amount of LED light entering the light guiding member 403 at the position of the incident surface convex portion 403c increases, which makes is possible to increase the luminance at the ends of irradiation where the luminance tends to be low. Consequently, an efficient light irradiator 400 having a less variation in the intensity of the luminance can be obtained.

As illustrated in FIG. 10, a value greater than the accumulated value of the mounting tolerance of LED 43 and the tolerances of the parts of the light guiding member 403 is set for a thickness t1 (vertical direction in FIG. 10) of the incident surface convex portion 403c. In general, in a case of the LED of a side type, the pad for mounting is small because of the structural constraint. Therefore, the mounting strength tends to be weak. However, by setting the thickness of the incident surface convex portion 403c of the light guiding member 403 as described above, among the incident surface 403a of the light guiding member 403, the end surface 403d, which is concave to the incident surface convex portion 403c, is prevented from contacting the LED 43. That is, since the contact between the light guiding member 403 and the LED 43 is prevented, a durable, shock-resistant light irradiator 400 can be provided.

Next, the sequence of assembling the light irradiator 400 is described.

Figure 11:
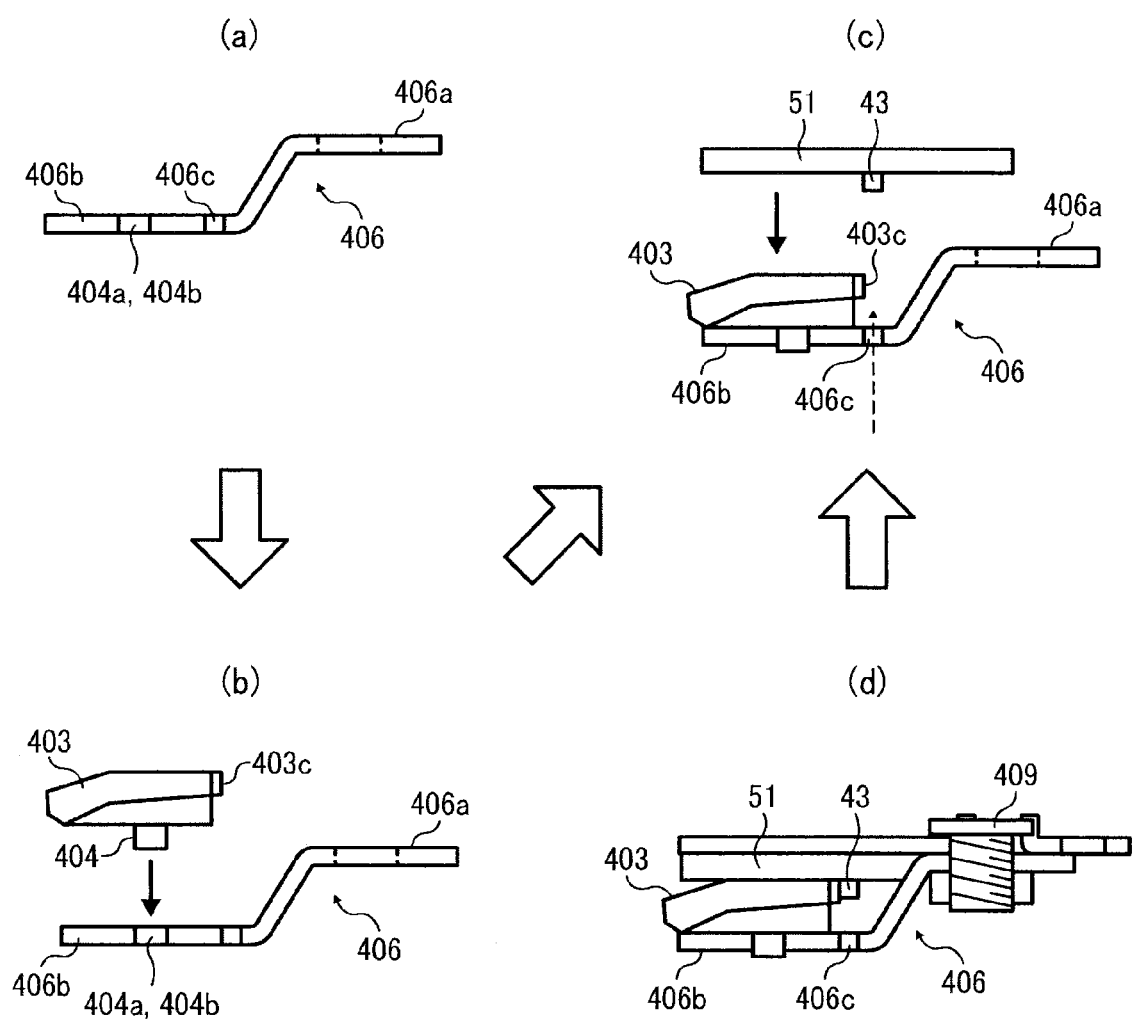
FIGS. 11(*a*), (*b*), (*c*), and (*d*) are diagrams illustrating an example of an assembly process of the light irradiator.

As illustrated in FIG. 11(a), the cover member 406 is simply set in a jig. The cover member 406 in this setting is vertically reversed to those illustrated in FIGS. 4 and 5.

As illustrated in FIG. 11(b), the light guiding member 403 is attached to the cover member 406. As described above, the positioning pins 404 formed on the light guiding member 403 are inserted into holes 404a and 404b formed on the cover member 406.

Figure 6:
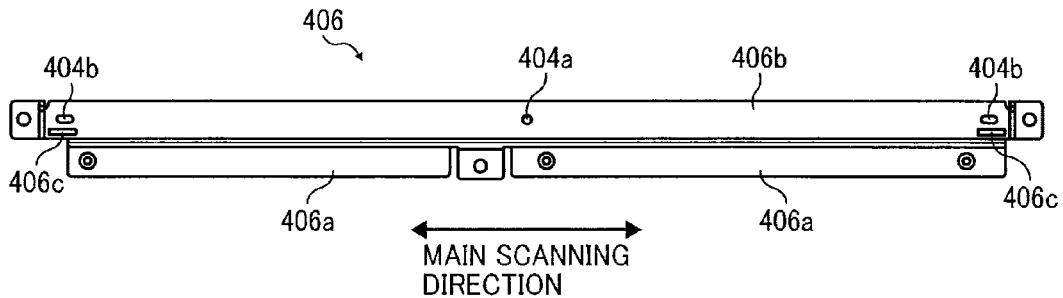
FIG. 6 is a planar view illustrating an example of a structure of a covering member the light irradiator has.
Figure 7:
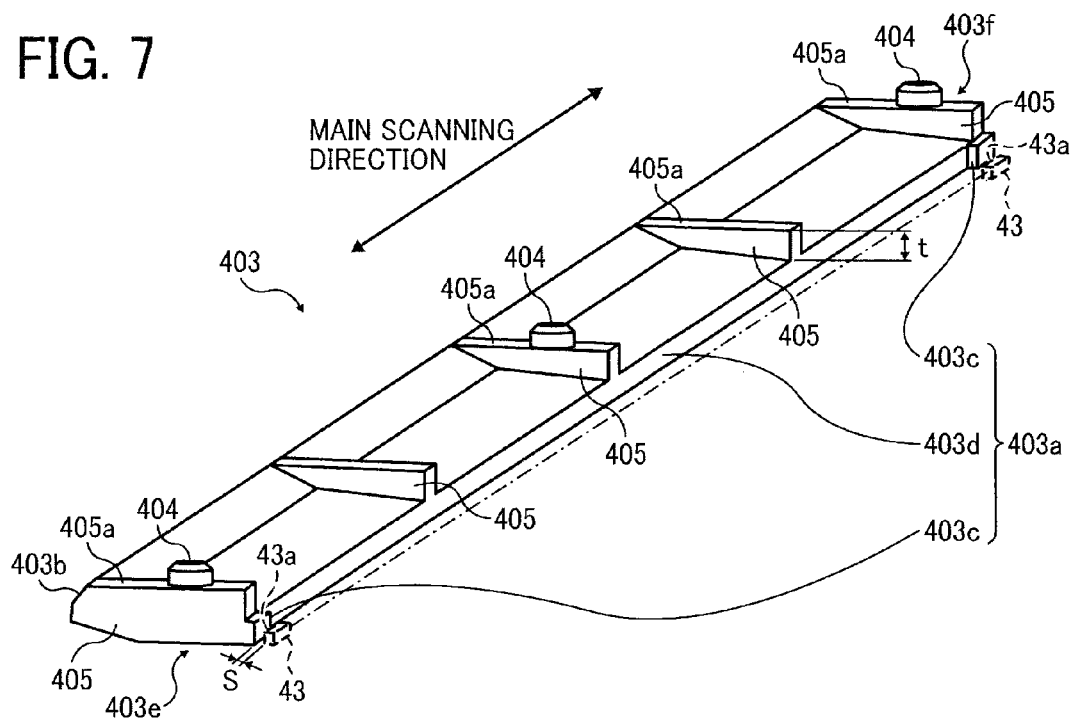
FIG. 7 is a perspective view illustrating an example of a structure of the light guiding member the light irradiator has.

While the hole 404a is a circle hole, the holes 404b formed at both ends are elongate holes having a major diameter in the main scanning direction as illustrated in FIG. 6

Therefore, if the light guiding member 403 thermally expands by the heat produced by the LED substrate 51, great deformation regarding the main scanning direction can be absorbed.

Therefore, even when the LED substrate 51 produces heat excessively, the light guiding member 403 stays as it is positioned.

As illustrated in FIG. 11(c), the LED substrate 51 and the LED 43 are placed on the light guiding member 403 with these facing down.

The LED substrate 51 is provided at the position roughly determined by a positioning pin of the jig. A notch 406c having a square form is formed on the cover member 406 on the extended line of the LED 43 mounted on both ends of the cover member 406 as illustrated in FIG. 6. From the notch 406c, the distance between the LED 43 and the incident surface convex portion 403c formed on the irradiation surface of the light guiding member 403 can be monitored by using a camera, etc.

In addition, the positioning pin of the jig which roughly positions the LED substrate 51 is slidably provided in the sub-scanning direction. By sliding the positioning pin of the jig in the sub-scanning direction while monitoring the distance between the irradiation surface 43a of the LED 43 and the irradiation surface 403c of the light guiding member 403, adjusting the position of the LED substrate 51 is possible.

As illustrated in FIG. 11(d), while keeping this state, the cover member 406 and the LED substrate 51 are fastened by the three screws 409 to complete the assembly of the light irradiator 400.

By providing the incident surface convex portion 403c to the light guiding member 403 in such a manner, this serves as the reference of adjustment so that the position of the LED 43 located closest can be set at a desired position. Consequently, it is possible to determine the relative positions of the light guiding member 403 and the LED 43 by simply monitoring the position by a camera or a worker. In addition, compared to the typical case in which part of the LED substrate is used as the position determining reference, the accumulation of the tolerances of the parts is minimum by determining the relative positions of the LED 43 and the light guiding member 403 referring to the position of the LED 43 that has a direct impact on the illuminance distribution.

Consequently, the irradiation surface 43a of the LED 43 and the incident surface 403a of the light guiding member 403 come closer so that an efficient light irradiator 400 having a less variation in the intensity of the luminance can be provided and also the image scanner 13 and the image forming apparatus 10 having the light irradiator 400 can be provided.

According to the procedure described above, the LED 43 and the light guiding member 403 are arranged with a predetermined distance in the sub-scanning direction. Since the area (vertical width in FIG. 4) of the incident surface 403a of the light guiding member 403 is greater than that of the irradiation surface 43a, the light emitted widely from the LED 43 securely enters the incident surface 403a. In addition, since the form of the light guiding member 403 is a significant cuboid, which is suitable to total reflection (i.e., having a sufficient length in the light-guiding direction), the light that has entered the light guiding member 403 travels and is totally reflected inside to have a suitable illuminance distribution.

The bottom surface of the cover member 406 facing the light guiding member 403 and the upper surface of the LED substrate 51 are processed to a degree that the total reflection of the light guiding member 403 is not inhibited. That is, as illustrated in FIG. 4, the gaps between the light guiding member 403 and the other members are provided to prevent the other members that contact the light guiding member 403 from absorbing the light guided by the light guiding member 403. The irradiation light of the LED 43 enters from the incident surface 403a of the light guiding member 403, travels in the light guiding member 403 while (totally) reflecting at the top surface, the bottom surface, and the side surfaces of the light guiding member 403, and emits from the irradiation surface 403b of the light guiding member 403 toward the reflector 301 and the contact glass 15.

As illustrated in FIG. 4, the reflector 301 serving as the reflection member is provided in the first carriage 35. The reflector 301 faces the irradiation surface 403b of the light guiding member 403. On the upper part of the reflector 301, a folded part 301a is formed which is folded toward the sub-scanning direction, i.e., the travelling return direction side of the first carriage 35 in order to guide the light emitted from the light guiding member 403 to the contact glass 15.

The reflector 301 reflects the light emitted from the light guiding member 403 at the folded part 301a.

By this reflection, for example, in a case of scanning a patched document P, the impact caused by the concavo-convex of the document P can be cancelled.

The irradiation light of the LED 43 transmits through the light guiding member 403, reflects at the reflector 301, and reaches the area of an irradiation area E of the contact glass 15. The irradiation area E extends along the sub-scanning direction of the document P. In the irradiation area E, the image of the document P that is present on the contact glass 15 is scanned.

In addition, the light guiding member 403 is arranged between the LED 43 and the contact glass 15 and the LED 43 is placed on the upper surface of the LED substrate 51.

Therefore, it is possible to prevent the light from evading on the right side of the sub-scanning direction relative to the irradiation area E (dotted lines in FIG. 4), i.e., the direction in which the first carriage 35 travels on the sub-scanning direction side of the document and irradiate the area within the irradiation area E with the beams of light.

In addition, the cover member 406 is made of a light-shielding member having a high density through which no or little light transmits such as polyester film or polyethylene terephthalate containing black carbon. Therefore, the cover member 406 securely shields the light. On the other hand, an opening 304 is formed on the base 407 to let the light from the light guiding member 403 travel to the document P and the light reflected at the document P enter the first mirror 44a.

Next, the driving mechanism of the carriage is described.

The first carriage 35 is provided between the wire driving pulley 34 and the second carriage 36. When the first carriage 35 is pulled by the driving wire 33 and travels at a predetermined velocity V, the members such as the cover member 406, a receiving platform 405, the light guiding member 403, and the LED substrate 51 that form the light irradiator 400 irradiate the document P placed on the contact glass 15.

The reflection light from the document P irradiated by the light guiding member 403 returns toward the second carriage 36 by the first mirror 44a, is furthermore reflected at a second mirror 44b and a third mirror 44c provided to the second carriage 36, and enters the lens unit 37.

The reflection light focuses an image on an image pickup 57 of a CCD, etc. placed on the focus surface by an imaging lens contained in the lens unit 37. Therefore, the pickup device 57 mainly scans lines on the document along the LED 43.

In addition, the second carriage 36 travels at a half speed of that of the first carriage 35, i.e., V/2, in the same direction as the first carriage 35 to cancel the overlapped portions in the light path ascribable to the returning of light by the second mirror 44b and the third mirror 44c. The second carriage 36 travels a half distance (L/2) of the travel distance L of the first carriage 35. According to this travel relationship, when the first carriage 35 and the second carriage 36 travel, the light path length from the document surface to the lens unit 37 is unchanging.

The driving wire 33 is wound round the wire driving pulley 34 and has two systems extending in the left direction and the right direction. A portion 33a of the driving wire extending in the left direction is folded back by the idler pulley 41 whose shaft is fixed to the main frame 31 to make a portion 33b, reaches to an outside carriage pulley 40b, is folded back again to make a portion 33c whose end is fixed to the idler pulley 41.

A portion 33d of the driving wire 33 extending in the right direction becomes a portion e when the portion 33d is folded back by the idler pulley 42 fixed to the main frame 31. The portion 33e reaches an inside carriage pulley 40a and folded back again to become a portion 33f, which is fixed onto the idler pulley 42 via the tension spring 39 serving as a spring member.

In FIG. 2, a home position sensor is provided on the left side. The first carriage 35 travels toward the left in FIG. 2 and passes through the home position sensor, thereby driving the motor to drive the driving shaft 32. After an amount of predetermined pulses, the motor stops.

At this time, the wire driving pulley 34 is stopped via the driving shaft 32. This position is the home position of the first carriage 35. When finishing scanning a document, the first carriage 35 always travels back to the home position and starts travelling therefrom again.

The first carriage 35 and the second carriage 36 of this embodiment travel in the scanning direction on the right when scanning the document P by irradiating the document P with beams of light from the LED 43 that have passed through the light guiding member 403 and in the returning direction on the left when returning to the home position in FIG. 1.

When travelling to the returning direction, the first carriage 35 and the second carriage 36 travel at a high speed irrespective of the scanning speed of the document P to improve the productivity of imaging the document P.

In the photocopier 10 having the image scanner 13 having such a structure, the LED 43 irradiates the document P with beams of light by way of the light guiding member 403 by travelling the first carriage 35 and the second carriage 36 in the sub-scanning direction. Part of the beams of light emitted from the light guiding member 403 is reflected by the reflector 301 toward the document P. As a result, the document P is irradiated with the beams of light in the range indicated by the irradiation area E.

The reflection light from the document P is reflected at the first mirror 44a, the second mirror 44b, and the third mirror 44c in this consequence, thereafter enters the lens unit 37, and is focused at the pickup device 57 placed on the focus surface by the imaging lens of the lens unit 37. Consequently, the pickup device 57 scans the lines on the document P along the LED 43 and the light guiding member 403 in the main scanning direction and the sub-scanning direction.

According to the image forming apparatus 10, by providing the incident surface convex portion 403c of the light guiding member 403 to determine the relational position between the incident surface convex portion 403c and the irradiation surface 43a of the LED 43, the positions of both can be determined with a high precision while reducing the accumulation of the tolerance of the parts to the minimum.

That is, the incident surface 403a of the light guiding member 403 can be placed closer to the irradiation surface 43a of the LED 43. Therefore, the beams of light from the LED 43 can be efficiently guided from the light guiding member 403 to the irradiation area E.

Therefore, it is possible to supply the required amount of beams of light for scanning to the irradiation area E. Consequently, highly precise image scanning is made possible.

Although it seems possible to determine the relational position with the light guiding member 403 by providing a reference hole, etc. for positioning to the LED substrate 51, the accumulation of the tolerances of the parts between the incident surface 403a of the light guiding member 403 and the irradiation 43a of the LED 43 becomes large, thereby making it impossible to get both closer. As a result, the amount of the beams of light is not secured, which is not preferable.

In this embodiment, the distance between the light guiding member 403 and the irradiation surface 43a of the LED 43 is set to be zero (i.e., in contact) but is not necessarily limited thereto (not in contact). This non-contact case is made possible by moving the pin of the jig that holds the LED substrate 51 away from the LED 43 after bringing the incident surface 403a of the light guiding member 403 into contact with the irradiation surface 43a of the LED 43 by the jig.

Therefore, since the LED 43 is fixed without contacting the other parts, the impact is not transferred to the LED 43, thereby providing an advantageous light irradiator in terms of impacts. Furthermore, it is possible to provide the image scanner 13 producing quality images.

The image scanner of the present disclosure is not limited to the image scanner 13 of the differential type described above. An image scanner having a contact image sensor (CIS) and CCD and an image scanning optical system such as lenses and mirrors integrally to scan a document are also suitably used. In such a case, high quality image scanning is also possible.

What is claimed is:

1. A light irradiator comprising:
   multiple point light sources arranged in a straight line;
   a light-transmissive light guiding member provided in front of the point light sources in an emission direction of beams of light emitted from the point light sources, the light guiding member guiding the beams of light in a predetermined direction toward a surface to be irradiated; and
   two or more protrusions protruding toward the point light sources, provided on a light entering surface of the light guiding member and arranged in the same direction as the point light sources,
   the light guiding member and the point light sources being positioned such that a distance between the protrusions provided to the light guiding member and irradiation surfaces of the point light sources is equal at two positions.

2. The light irradiator according to claim 1, wherein the two or more protrusions of the light guiding member are provided at both ends of the light guiding member placed significantly parallel to line of point light sources.

3. The light irradiator according to claim 1, wherein each of the two or more protrusions of the light guiding member faces a respective one of the point light sources one-to-one.

4. The light irradiator according to claim 3, wherein the two or more protrusions of the light guiding member are provided at any position except a center portion of the irradiation surface of the point light sources.

5. The light irradiator according to claim 1, wherein the distance between the two or more protrusions provided to the light guiding member and the irradiation surfaces of the point light sources is zero.

6. The light irradiator according to claim 1, wherein anti-reflection devices are provided to the two or more protrusions of the light guiding member.

7. An image scanner comprising:
   the light irradiator of claim 1.

8. An image forming apparatus comprising:
   the image scanner of claim 7.

* * * * *